(12) United States Patent
Blacker et al.

(10) Patent No.: US 8,420,162 B2
(45) Date of Patent: Apr. 16, 2013

(54) METHOD OF MAKING COATED ARTICLE USING RAPID HEATING FOR REDUCING EMISSIVITY AND/OR SHEET RESISTANCE, AND CORRESPONDING PRODUCT

(75) Inventors: Richard Blacker, Farmington Hills, MI (US); Gerald Worley, Monroe, MI (US); Bernd Disteldorf, Mettlach (DE)

(73) Assignees: Guardian Industries Corp., Auburn Hills, MI (US); Centre Luxembourgeios de Recherches pour le Verre et la Ceramique S.A. (C.R.V.C.), Luxembourg (LU)

( * ) Notice: Subject to any disclaimer, the term of this patent is extended or adjusted under 35 U.S.C. 154(b) by 1229 days.

(21) Appl. No.: 11/482,103

(22) Filed: Jul. 7, 2006

(65) Prior Publication Data

US 2008/0008829 A1   Jan. 10, 2008

(51) Int. Cl.
   *B05D 5/06*   (2006.01)
(52) U.S. Cl.
   USPC ............ 427/165; 427/372.2; 427/383.1; 427/532
(58) Field of Classification Search .......... 427/162, 427/165, 402, 372.2, 383.1, 532
   See application file for complete search history.

(56) References Cited

U.S. PATENT DOCUMENTS

| | | | |
|---|---|---|---|
| 5,093,207 A * | 3/1992 | Hodes et al. | 428/614 |
| 5,344,718 A | 9/1994 | Hartig et al. | |
| 5,514,476 A | 5/1996 | Hartig et al. | |
| 5,557,462 A | 9/1996 | Hartig et al. | |
| 5,584,902 A | 12/1996 | Hartig et al. | |
| 5,770,321 A | 6/1998 | Hartig et al. | |
| 5,800,933 A | 9/1998 | Hartig et al. | |
| 6,042,752 A | 3/2000 | Mitsui | |
| 6,059,909 A | 5/2000 | Hartig et al. | |
| 6,635,321 B2 | 10/2003 | Wang et al. | |
| 6,641,689 B1 | 11/2003 | Aggas | |
| 6,686,050 B2 | 2/2004 | Lingle et al. | |
| 6,701,749 B2 | 3/2004 | Wang et al. | |
| 6,802,943 B2 | 10/2004 | Stachowiak | |
| 6,830,817 B2 | 12/2004 | Stachowiak | |
| 6,916,408 B2 | 7/2005 | Laird et al. | |
| 2001/0041252 A1 | 11/2001 | Laird | |
| 2002/0031674 A1 * | 3/2002 | Laird | 428/472 |
| 2006/0099428 A1 | 5/2006 | Butz et al. | |

FOREIGN PATENT DOCUMENTS

| | | |
|---|---|---|
| EP | 0 634 376 | 1/1995 |
| EP | 0 646 660 | 4/1995 |
| EP | 0 676 379 | 10/1995 |
| EP | 676379 | * 10/1995 |
| JP | 07-114841 | 5/1995 |

* cited by examiner

*Primary Examiner* — Elizabeth Burkhart
(74) *Attorney, Agent, or Firm* — Nixon & Vanderhye P.C.

(57) ABSTRACT

This invention relates to a method of making a coated article for use in insulating glass (IG) window units, vehicle windows, or the like. The coated article typically includes a low-E coated article, including a low-E (low emissivity) coating supported by a glass substrate. In certain example embodiments, rapid heating (not sufficient for tempering or heat bending) of the coated article is utilized in order to reduce the emissivity and/or sheet resistance of the coated article without significantly damaging the infrared (IR) reflecting layer(s) of the coating, thereby activating the coated article. The glass of the coated article does not become too hot during such rapid heating.

18 Claims, 3 Drawing Sheets

METHOD OF MAKING COATED ARTICLE USING RAPID HEATING FOR REDUCING EMISSIVITY AND/OR SHEET RESISTANCE, AND CORRESPONDING PRODUCT

This invention relates to a method of making a coated article for use in insulating glass (IG) window units, vehicle windows, or the like. In certain example embodiments, this invention utilizes rapid heating (not sufficient for tempering or heat bending) of a coated article in order to reduce the emissivity and/or sheet resistance of the coated article without significantly damaging the infrared (IR) reflecting layer(s) of the coating.

BACKGROUND AND SUMMARY OF EXAMPLE EMBODIMENTS OF THE INVENTION

Coated articles are known in the art. Example coated articles, with low-emissivity coatings on glass substrates, are described in U.S. Patent Document Nos. 2001/0041252, U.S. Pat. Nos. 6,059,909, 5,770,321, 5,800,933, 6,916,408, 5,344,718, 5,514,476, 5,584,902, 5,557,462, 6,802,943, 6,830,817 and 6,686,050, the disclosures of which are all hereby incorporated herein by reference. The coatings of these coated articles are examples of low-emissivity (low-E) coatings that are used for solar control purposes. These coatings block significant amounts of infrared (IR) radiation thereby keeping building/vehicle interiors cooler in hot weather conditions for instance.

Certain low-E coated articles are heat treatable (e.g., thermally temperable), while others are not. A known type of heat treatment in this art is referred to as "tempering."

Tempered glass is typically from about four to ten times stronger than ordinary (or annealed) non-tempered glass. Unlike annealed glass which can shatter into jagged shards when broken, tempered glass fractures into small, relatively harmless pieces. Thermal tempering of a coated article (i.e., tempering the glass substrate thereof) involves heating the glass substrate of the coated article to a temperature of at least about 580 degrees C., more typically at least about 600 or 620 degrees C. The glass then undergoes a high-pressure cooling procedure known as quenching. During quenching, which lasts just seconds, high pressure air blasts the surface of the glass from an array of nozzles so as to cool the outer surfaces of the glass much more quickly than the center of the glass. As the center of the glass cools, it tries to pull back from the outer surfaces. As a result, the center remains in tension, and the outer surfaces go into compression, which gives tempered glass its improved strength. Annealed glass will break at about 6,000 pounds per square inch (psi). Meanwhile, tempered glass, according to federal specifications, must have a surface compression of 10,000 psi or more; it generally breaks at about 24,000 psi.

It is known that when a coated article including a glass substrate supporting a low-E coating is thermally tempered, the emissivity and sheet resistance ($R_s$) of the low-E coating often decrease in coatings which are temperable, due to such tempering. It is said that the IR reflecting silver layer(s) of such low-E coatings, which yield emissive properties, may undergo some recrystallization and crystal perfection during heating, thereby leading to improved carrier mobility and thus reduced resistivity and emissivity following tempering. Lower emissivity (normal and/or hemispherical) and lower sheet resistance ($R_s$) characteristics are highly desirable in low-E coatings, because they indicate an increased ability to block IR radiation from reaching the interior of a building or vehicle on which the coated article is mounted.

However, non-temperable low-E coatings cannot be subjected to such intense heating as that involved in thermal tempering (at least about 580, 600 or 620 degrees C.) because their silver layer(s) are inadequately protected in many instances, and thus suffer undesirable degradation during thermal tempering. Thus, non-temperable (or non-heat-treatable) low-E coatings often suffer an increase in emissivity in combination with an increase in haze, corrosion, or the like, upon exposure to thermal tempering. Coatings which suffer from a significant increase in emissivity, haze and/or corrosion upon thermal tempering typically are not commercially usable. Thus, it will be appreciated that many low-E coatings are not thermally temperable because they suffer destructive degradation as a result of the high temperatures used in thermal tempering.

Accordingly, it will be appreciated that there exists a need in the art for a technique by which a non-temperable low-E coated article can be treated to reduce its emissivity (normal and/or hemispherical) and/or sheet resistance ($R_s$).

In certain example embodiments of this invention, a non-temperable low-E coated article is subjected to rapid heat treatment, but only so that the glass of the coated article does not heat to an extent necessary for thermal tempering or heat bending purposes. In certain example embodiments of this invention, at least one flame is utilized to rapidly heat the low-E coating of the low-E coated article, the heat from the flame(s) being sufficient to cause at least one IR reflective layer(s) (e.g., silver based layer(s)) of the coating to undergo at least some recrystallization and/or crystal perfection during such heating. However, the heat from the flame is not sufficient to cause thermal tempering or heat bending of the glass. In other words, the tempering of the glass remains below the range necessary for thermal tempering for example. The result is a low-E coated article which is not thermally tempered, but has a low-E coating which has a reduced emissivity and/or sheet resistance compared to if the rapid heat treatment had not been performed.

In certain example embodiments of this invention, there is provided a method of making a coated article with reduced emissivity and/or sheet resistance ($R_s$), the method comprising: forming a low-E coating on a glass substrate thereby resulting in a coated article, the low-E coating comprising at least one infrared (IR) reflecting layer (e.g., silver based) sandwiched between at least first and second dielectric layers; and rapid heating the coated article comprising the low-E coating and glass substrate, said rapid heating being performed in a manner such that (a) the emissivity and/or sheet resistance of the low-E coating decrease by at least about 3% due to the rapid heating, and (b) the glass substrate does not exceed a temperature of about 400 degrees C. during the rapid heating.

DETAILED DESCRIPTION OF EXAMPLE EMBODIMENTS OF THE INVENTION

Figure 1:
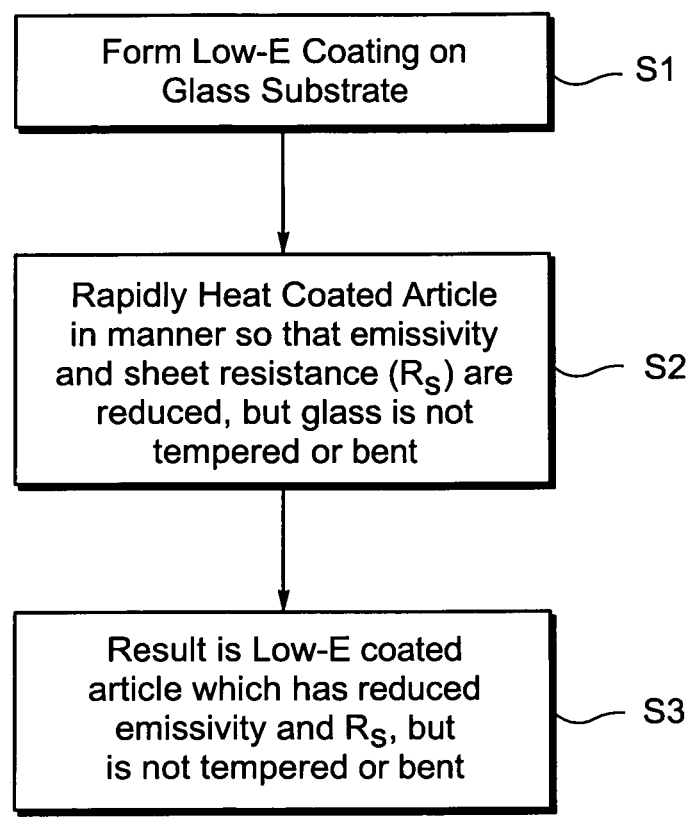
FIG. 1 is a flowchart illustrating steps performed according to an example embodiment of this invention.

Referring now more particularly to the accompanying drawings in which like reference numerals indicate like parts throughout the several views.

In certain example embodiments of this invention, a non-temperable low-E coated article is subjected to rapid heat treatment, but only so that the glass of the coated article does not heat to an extent necessary for thermal tempering or heat bending purposes. In certain example embodiments of this invention, at least one flame is utilized to rapidly heat the low-E coating of the low-E coated article, the heat from the flame(s) being sufficient to cause at least one IR reflective layer(s) (e.g., silver based layer(s)) of the coating to undergo at least some recrystallization and/or crystal perfection during such heating. However, the heat from the flame is not sufficient to cause thermal tempering or heat bending of the glass. In other words, the temperature of the glass remains below the range necessary for thermal tempering for example. The result is a low-E coated article which is not thermally tempered, but has a low-E coating which has a reduced emissivity and/or sheet resistance compared to if the rapid heat treatment had not been performed.

Figure 3:
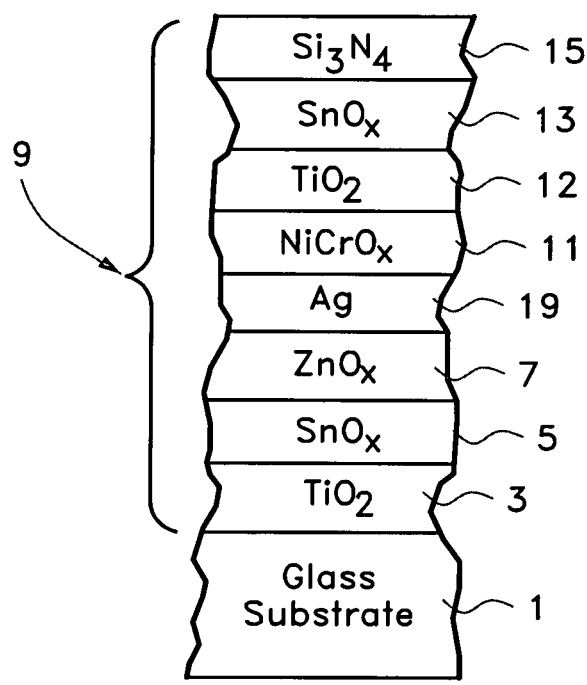
FIG. 3 is a cross sectional view of an example low-E coated article according to an example embodiment of this invention.

A low-E coating according to certain example embodiments of this invention includes one or more layers, although in many embodiments it is a multi-layer coating including at least one IR blocking layer (e.g., layer based on Ag, Au, or some other IR reflecting metal(s)) sandwiched between at least a pair of dielectric layers. Since one example function of low-E or solar management coating is to block (i.e., reflect and/or absorb) certain amounts of IR radiation and prevent the same from reaching the building (or vehicle) interior, the coating includes at least one IR blocking (i.e., IR reflecting and/or absorbing) layer. Example IR blocking layer(s) which may be present in a low-E coating are of or include silver (Ag), nickel-chrome (NiCr), gold (Au), and/or any other suitable material that blocks significant amounts of IR radiation. It will be appreciated by those skilled in the art that IR blocking layer(s) of a low-E coating need not block all IR radiation, but only need to block significant amounts thereof. In certain embodiments, each IR blocking layer (there may be more than one in a low-E coating) is provided between at least a pair of dielectric layers. Example dielectric layers include silicon nitride, titanium oxide, silicon oxynitride, tin oxide, and/or other types of metal-oxides and/or metal-nitrides. In certain example embodiments, in addition to being between a pair of dielectric layers, each IR blocking layer may also be provided between a pair of contact layers of or including a material such as an oxide and/or nitride of nickel-chrome, titanium, or any other suitable material. An example non-limiting low-E coating 9 which may be provided on a glass substrate is illustrated in FIG. 3, and is more fully discussed below. Of course, low-E/solar management coatings herein are not limited to the illustrated coating, and any other suitable solar management coating capable of blocking amounts of IR radiation may instead be used. Low-E coatings may be deposited on glass substrates in any suitable manner, including but not limited to sputtering, vapor deposition, and/or any other suitable technique.

Figure 2:
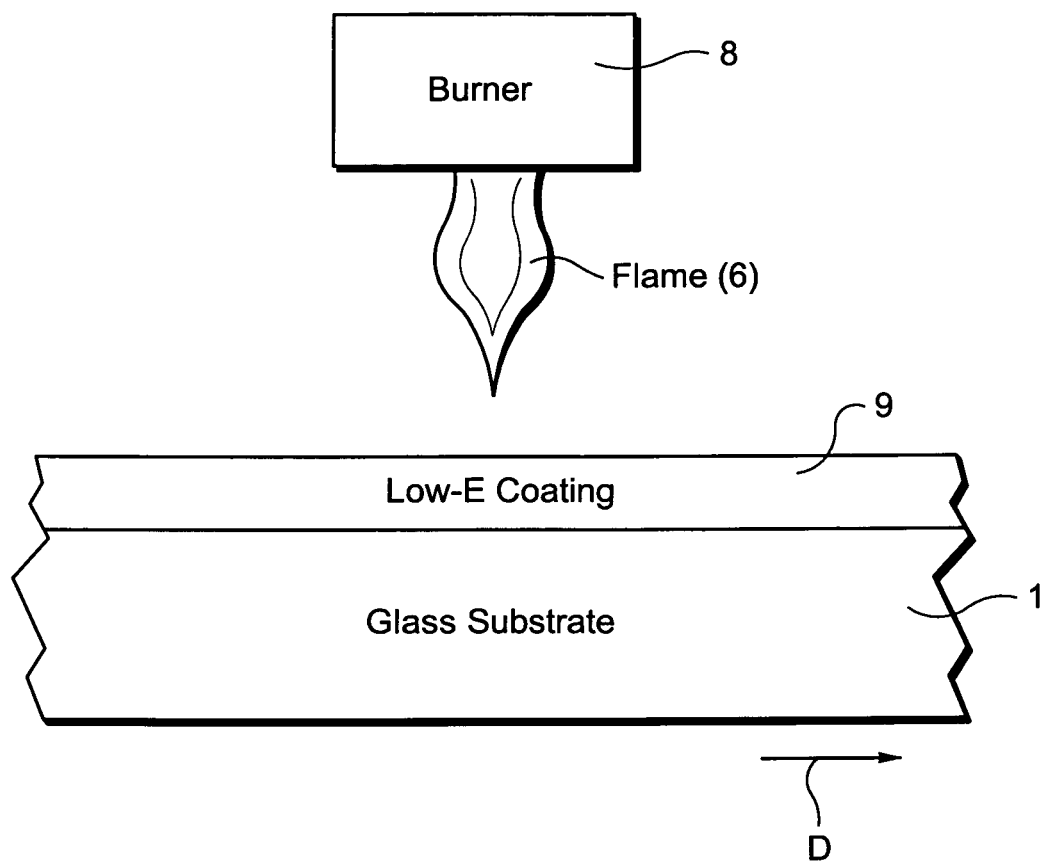
FIG. 2 is a schematic partial cross sectional diagram illustrating a low-E coated article being subjected to rapid heat treatment according to an example embodiment of this invention.

FIG. 1 is a flowchart illustrating example steps performed according to an example embodiment of this invention, whereas FIG. 2 is a schematic diagram illustrating rapid heating of a low-E coated article according to an example embodiment of this invention. Referring to FIGS. 1-2, an example embodiment of this invention will now be described. Initially, a low-E coating 9 is deposited (e.g., via sputtering or the like) on an annealed (non-tempered) glass substrate 1 (S1 in FIG. 1). An example low-E coating is illustrated in FIG. 3, and discussed below. Other example low-E coatings 9 that may be used are described in U.S. Patent Document Nos. 2001/0041252, U.S. Pat. Nos. 6,059,909, 5,770,321, 5,800,933, 6,916,408, 5,344,718, 5,514,476, 5,584,902, 5,557,462, 6,802,943, 6,830,817 and 6,686,050, the disclosures of which are all hereby incorporated herein by reference. In certain example embodiments, the low-E coating 9 is non-temperable. In other words, in such example embodiments, the low-E coated article cannot be thermally tempered without severely damaging the low-E coating (e.g., by causing emissivity to increase, haze to significantly increase, significant corrosion to occur, or the like) such that it cannot practically be used commercially.

After the low-E coating 9 has been formed on the glass substrate 1, the coating is rapidly heated in a manner so that the emissivity and/or sheet resistance of the coating decrease (S2 in FIG. 1). However, this heat treatment is not sufficient for thermal tempering or heat bending of the glass 1. In other words, the low-E coated article is rapidly heat treated, but such that the glass 1 of the coated article does not heat to an extent necessary for thermal tempering or heat bending thereof. In certain example embodiments of this invention, at least one flame 6 is utilized to rapidly heat the low-E coating 9 of the low-E coated article, the heat from the flame(s) being sufficient to cause at least one IR reflective layer(s) (e.g., silver based layer(s)) of the coating to undergo at least some recrystallization and/or crystal perfection during such heating so that emissivity and/or sheet resistance of the coating decrease. However, the heat from the flame 6 is not sufficient to cause thermal tempering or heat bending of the glass. In certain example embodiments, the rapid heating may comprise heating the coated article for from about 3-300 seconds, more preferably from about 7 to 200 seconds, even more preferably from about 10 to 150 seconds, still more preferably from about 10 to 100 seconds, still more preferably from about 10 to 50 seconds, and most preferably from about 20 to 30 seconds.

In certain example embodiments of this invention, a heating system including at least one flame 6 and burner may be provided at or near the exit end of a sputter-coating facility in order to activate the low-E coated article (reduce its emissivity and/or sheet resistance) with minimal heating to the base glass substrate 1. In certain example embodiments, as shown in FIG. 2, the burner(s) is/are provided only on the coating side of the coated article so as to keep the temperature of the glass 1 as low as possible to prevent tempering/bending or the like. In such a way, the insulating or thermal performance of the low-E coated glass can be improved, with no or minimal change in visible product attributes of color and/or reflectivity.

In certain example embodiments of this invention, at least one butane burner 8 may be used to produce flame 6 for the rapid heating. In certain example instances, the flame 6 may be manually or automatically moved or played across the coated glass. However, any suitable heating system (e.g., gas flame, hydrogen flame, other combustion flame, hot emissive wire heater, or microwave) may instead be used to rapidly heat the coating 9 as discussed herein, so long as the heating is rapid (e.g., impulse) enough not to greatly raise the glass temperature to the tempering and/or heat bending range.

In certain example embodiments of this invention, the rapid heating is sufficient to lower the emissivity and/or sheet resistance of the coating or coated article at least about 2%, more preferably at least about 3%, even more preferably at least about 5%, even more preferably at least about 7 or 8%, still more preferably by at least about 10%, and possibly even by at least about 15%. Example data shows a decrease in sheet resistance ($R_s$) in a double silver coating of from about 15 to 32% due to the rapid heating. In certain example embodiments of this invention, this drop in emissivity and/or sheet resistance is coupled with substantially maintaining the color and reflective optical properties of the coated article (from before to after the rapid heat treatment).

In certain example embodiments of this invention, the heater which performs the rapid heating (e.g., see flame(s) 6 in FIG. 2) raises the temperature of the coating to above that of room temperature or ambient temperature. However, the heater which performs the rapid heating does not heat the glass 1 to a temperature above about 450 degrees C. In other words, the glass substrate 1 does not exceed a temperature of about 450 degrees C. (more preferably about 400 degrees C., even more preferably about 350 degrees C., even more preferably about 300 degrees C., even more preferably about 250 degrees C., even more preferably about 200 degrees C., even more preferably about 150 degrees C., and most preferably about 100 degrees C., and still more preferably the glass does not exceed a temperature of about 60 degrees C. during the rapid heating step. Thus, while heating the coating 9 to a level sufficient to cause the IR reflecting layer(s) (e.g., see layer 19 in FIG. 3) of the coating to undergo at least some recrystallization and/or crystal perfection during such heating thereby lowering emissivity and/or sheet resistance, does not heat the glass 1 too much, so that optical properties can be substantially maintained even though IR reflecting properties (emissivity and/or sheet resistance) are improved. The result of the rapid heating is a low-E coated article which is not thermally tempered, but has a low-E coating 9 which has a reduced emissivity and/or sheet resistance compared to if the rapid heat treatment had not been performed. It is noted that the coating may be heated to a greater extend than the glass during the rapid heating. For example, the coating may be heated to a temperature of from about 100 to 550 degrees C., more preferably from about 150 to 450 degrees C., and possibly from about 250 to 450 (or 500) degrees C.

FIG. 3 is a side cross sectional view of an example low-E coating 9 that may be provided on substrate 1 and used in connection with the example embodiments herein. Glass substrate 1 may be, for example and without limitation, clear, green, bronze, or blue-green glass from about 1.0 to 10.0 mm thick, more preferably from about 1.8 mm to 4 mm thick. As shown in FIG. 3, the low-E coating 9 may comprise dielectric layer 3, dielectric layer 5, zinc oxide inclusive layer 7, IR reflecting layer 19 including or of silver, gold, or the like, upper contact layer 111 of or including an oxide of nickel chrome (e.g., NiCrO$_x$), a layer 12 consisting of or comprising titanium oxide (TiO$_x$), a metal oxide inclusive layer 13, and dielectric layer 15 of or including a material such as silicon nitride and/or silicon oxynitride which may in certain example instances be a protective overcoat. Other layers and/or materials may also be provided in certain example embodiments of this invention, and it is also possible that certain layers may be removed or split in certain example instances. It is noted that this particular coating and the materials therein are provided for purposes of example only and are not intended to be limiting; other coatings similar or dissimilar may instead be used in certain example embodiments of this invention.

The bottom dielectric layer 3 of the low-E coating may be of or include titanium oxide in certain example embodiments of this invention. The titanium oxide of layer 3 may in certain example instances be represented by TiO$_x$, where x is from 1.5 to 2.5, most preferably about 2.0. The titanium oxide may be deposited via sputtering or the like in different embodiments. In certain example instances, dielectric layer 3 may have an index of refraction (n), at 550 nm, of at least 2.0, more preferably of at least 2.1, and possibly from about 2.3 to 2.6 when the layer is of or includes titanium oxide. In certain embodiments of this invention, the thickness of titanium oxide inclusive layer 3 may optionally be controlled so as to allow a* and/or b* color values (e.g., transmissive, film side reflective, and/or glass side reflective) to be fairly neutral (i.e., close to zero) and/or desirable. Other materials may be used in addition to or instead of titanium oxide in certain example instances. In certain alternative embodiments, the Ti in oxide layer 3 may be replaced with another metal.

Dielectric layer 5 is optional, and may be of or include a metal oxide such as tin oxide in certain example embodiments of this invention. Metal oxide inclusive layer 5 may be provided in order to improve adhesion between titanium oxide layer 3 and zinc oxide layer 7 in certain example embodiments. The tin oxide layer 5 may be doped with other materials such as nitrogen in certain example embodiments of this invention. In certain instances, tin oxide inclusive layer 5 may be advantageous in that it may increase the throughput of the coater producing the coating or save costs, compared to if this portion of the coating was of titanium oxide or silicon nitride which are slower to sputter and/or more expensive (although these materials are also possible). Lower contact layer 7 in certain embodiments of this invention is of or includes zinc oxide (e.g., ZnO). The zinc oxide of layer(s) 7 may contain other materials as well such as Al (e.g., to form ZnAlO$_x$) in certain example embodiments. For example, in certain example embodiments of this invention, zinc oxide layer 7 may be doped with from about 1 to 10% Al (or B), more preferably from about 1 to 5% Al (or B), and most preferably about 2 to 4% Al (or B). The use of zinc oxide 7 under the silver in layer 9 allows for an excellent quality of silver to be achieved. It is also possible to form the lower contact layer(s) of an oxide of Ni and/or Cr in certain example embodiments.

Infrared (IR) reflecting layer 19 of the low-E coating is preferably substantially or entirely metallic and/or conductive, and may comprise or consist essentially of silver (Ag), gold, or any other suitable IR reflecting material. IR reflecting layer 19 helps allow the coating to have low-E and/or good solar control characteristics such as low emittance, low sheet resistance, and so forth. The IR reflecting layer 19 may, however, be slightly oxidized in certain embodiments of this invention. In certain example embodiments of this invention, the target-to-substrate distance of the silver target (e.g., silver planar target) used in sputtering IR reflecting layer 19 is reduced compared to conventional practice. The upper contact layer 11 of the low-E coating may be of or include an oxide of Ni and/or Cr. In certain example embodiments, upper contact layer 11 may be of or include nickel (Ni) oxide, chromium/chrome (Cr) oxide, or a nickel alloy oxide such as nickel chrome oxide (NiCrO$_x$), or other suitable material(s). The use of, for example, NiCrO$_x$ in this layer allows durability to be improved. The NiCrO$_x$ layer 11 may be fully oxidized in certain embodiments of this invention (i.e., fully stoichiometric), or alternatively may only be partially oxidized. In certain instances, the NiCrO$_x$ layer 11 may be at least about 50% oxidized. Contact layer 11 (e.g., of or including an oxide of Ni and/or Cr) may or may not be oxidation graded in different embodiments of this invention. Oxidation grading means that the degree of oxidation in the layer changes throughout the thickness of the layer so that for example a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layer 11 (e.g., of or including an oxide of Ni and/or Cr) may or may not be continuous in different embodiments of this invention across the entire IR reflecting layer.

Titanium oxide layer 12 is provided on and over the IR reflecting layer 19, and directly on and contacting the contact layer 111 in the FIG. 3 embodiment. As explained herein, it has been found that the provision of a layer 12 consisting essentially of or comprising titanium oxide over IR reflecting layer 19 improves the quality of the IR reflecting layer thereby permitting the coated article to realized improved thermal and/or optical properties. The titanium oxide layer 12 may be stoichiometric ($TiO_2$) or non-stoichiometric in different embodiments of this invention. Dielectric layer 13 may be of or include a metal oxide such as tin oxide in certain example embodiments of this invention. Metal oxide inclusive layer 13 is provided for antireflection purposes, and also improves the emissivity of the coated article and the stability and efficiency of the manufacturing process. Moreover, tin oxide in layer 13 provides good adhesion to the titanium oxide in layer 12, and provides for good durability in this respect. The tin oxide layer 13 may be doped with other materials such as nitrogen in certain example embodiments of this invention. In certain instances, tin oxide inclusive layer 5 may be advantageous in that it may increase the throughput of the coater producing the coating or save costs, compared to if this portion of the coating was of titanium oxide or silicon nitride which are slower to sputter and/or more expensive (although these materials are also possible to replace the layer 13). Dielectric layer 15, which may be an overcoat in certain example instances, may be of or include silicon nitride (e.g., $Si_3N_4$) or any other suitable material in certain example embodiments of this invention such as silicon oxynitride. Optionally, other layers may be provided above layer 15. Layer 15 is provided for durability purposes, and to protect the underlying layers. In certain example embodiments, layer 15 may have an index of refraction (n) of from about 1.9 to 2.2, more preferably from about 1.95 to 2.05.

Other layer(s) below or above the illustrated low-E coating 9 may also be provided. Thus, while the layer system or coating is "on" or "supported by" substrate 1 (directly or indirectly), other layer(s) may be provided therebetween. Thus, for example, the coating of FIG. 4 may be considered "on" and "supported by" the substrate 1 (or 3) even if other layer(s) are provided between layer 3 and substrate 1 (or 3). Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. For example and without limitation, layer 5 and/or layer 13 may be removed in certain example situations.

While various thicknesses may be used in different embodiments of this invention for the example non-limiting low-E coating 9, example thicknesses and materials for the respective layers on the glass substrate 1 in the FIG. 3 embodiment are as follows, from the glass substrate outwardly (e.g., the Al content in the zinc oxide layer 7 may be from about 1-10%, more preferably from about 1-3% in certain example instances):

TABLE 1

(Example Materials/Thicknesses; FIG. 3 Embodiment)

| Layer | Preferred Range (Å) | More Preferred (Å) | Example (Å) |
|---|---|---|---|
| $TiO_x$ (layer 3) | 30–400 Å | 80–250 Å | 180 Å |
| $SnO_2$ (layer 5) | 10–300 Å | 10–100 Å | 20 Å |
| $ZnAlO_x$ (layer 7) | 10–300 Å | 60–120 Å | 50 Å |
| Ag (layer 19) | 50–250 Å | 80–150 Å | 130 Å |
| $NiCrO_x$ (layer 11) | 10–80 Å | 20–70 Å | 30 Å |
| $TiO_x$ (layer 12) | 10–300 Å | 20–100 Å | 40 Å |
| $SnO_2$ (layer 13) | 40–400 Å | 100–200 Å | 160 Å |
| $Si_3N_4$ (layer 15) | 50–750 Å | 150–350 Å | 210 Å |

It has been found, for example and without limitation, that subjecting the low-E coated article of FIG. 3 (see Table 1 above) to a rapid heating using a butane burner with a naked gas flame (clearly not sufficient for tempering or bending) caused the sheet resistance of the low-E coating to be reduced from 3.33 ohms/square to 2.99 ohms/square (i.e., reduced about 10%). The concurrent emissivity drop was measured to be from 3.8% to 3.6%. This demonstrates the capability of certain example embodiments of this invention to reduce emissivity and sheet resistance without thermally tempering or heat bending.

It is also noted that other low-E coatings 9 may instead be used in any of the embodiments of FIGS. 1-3. For example and without limitation, the solar management or low-E coatings described and/or illustrated in any of U.S. Pat. Nos. 6,632,491, 5,800,933, 5,837,108, 5,557,462, 6,014,872, 5,514,476, 5,935,702, 4,965,121, 5,563,734, 6,030,671, 4,898,790, 5,902,505, 3,682,528, 2001/0041252, 6,059,909, 5,770,321, 6,916,408, 5,344,718, 5,584,902, 5,557,462, 6,802,943, 6,830,817, 6,686,050, or WO 01/66482, or WO 01/66483, may instead be used for low-E coating 9 in any embodiment of this invention, all of these patent documents being incorporated herein by reference.

The materials, specific layers, and thicknesses for the coatings discussed above are for example only and are not intended to be limiting unless specifically claimed.

Low-E coatings in certain example embodiments of this invention, before and/or after the rapid heat treatment described herein, have an emissivity ($E_n$) of no greater than about 0.10 and/or a sheet resistance ($R_s$) of no greater than about 8 ohms/square, more preferably no greater than about 7 or 6 ohms/square.

In certain example embodiments of this invention, an IG window unit including a coated article according to an example embodiment of this invention may have the following solar characteristics. In Table 2 below, $R_gY$ is visible reflection from the outside or exterior of the window/building (i.e., from where the sun is located, and $R_fY$ is visible reflection from the interior side (e.g., from within the building interior), and the a*, b* values under these respective reflection parameters also correspond to glass (g) side (i.e., from outside the window in FIGS. 1-2) and film (f) side (i.e., from interior the window in FIGS. 1-2). These solar characteristics are provided for purposes of example only and are not intended to be limiting unless expressly claimed.

TABLE 2

| IG Unit Solar Characteristics | | | |
|---|---|---|---|
| Characteristic | General | Preferred | More Preferred |
| $T_{vis}$ (or TY) (Ill. C., 2 deg.): | >=60% | >=68% | >=70% |
| $a*_t$ (Ill. C., 2°): | −10 to 10 | −5.0 to 0.0 | −3.5 to −1.5 |
| $b*_t$ (Ill. C., 2°): | −10 to 10 | −2.0 to 4.0 | 1.0 to 3.0 |
| $R_gY$ (Ill. C., 2 deg.): | 5 to 17% | 7 to 13% | 9 to 11% |
| $a*_g$ (Ill. C., 2°): | −8.0 to 8.0 | −3.0 to 2.0 | −2.0 to 0.5 |
| $b*_g$ (Ill. C., 2°): | −8.0 to 8.0 | −5.0 to 1.0 | −4.0 to −1.0 |
| $R_fY$ (Ill. C., 2 deg.): | 5 to 20% | 7 to 14% | 10 to 12% |
| $a*_f$ (Ill. C., 2°): | −8.0 to 8.0 | −3.0 to 2.0 | −1.5 to 0.5 |
| $b*_f$ (Ill. C., 2°): | −8.0 to 8.0 | −5.0 to 1.0 | −4.0 to −1.5 |
| SHGC: | <=0.50 | <=0.45 | <=0.40 |
| SC: | <=0.55 | <=0.49 | <=0.46 |
| U-value: | 0.10 to 0.40 | 0.20 to 0.30 | 0.22 to 0.25 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of making a coated article with reduced emissivity and/or sheet resistance, the method comprising:
   forming a low-E coating on a glass substrate thereby resulting in a coated article, the low-E coating comprising at least one infrared (IR) reflecting layer sandwiched between at least first and second dielectric layers, wherein an uppermost layer of the low-E coating is a layer comprising silicon nitride layer; and
   rapidly heating the coated article comprising the low-E coating and glass substrate, said rapid heating being performed within 20-30 seconds so that (a) the emissivity and/or sheet resistance of the low-E coating decreases by at least about 3% due to the rapid heating, (b) optical properties of the low-E coating are substantially maintained during the rapid heating, and wherein the glass substrate does not exceed a temperature of about 150 degrees C. during the rapid heating;
   wherein the layer comprising silicon nitride which is the uppermost layer of the low-E coating is the layer of the coating closest to a source of said heating.

2. The method of claim 1, wherein the glass substrate does not exceed a temperature of about 100 degrees C. during the rapid heating.

3. The method of claim 1, wherein the glass substrate does not exceed a temperature of about 60 degrees C. during the rapid heating.

4. The method of claim 1, wherein the rapid heating is performed using at least one gas flame, each said gas flame being located only on a coating side of the coated article.

5. The method of claim 1, wherein the rapid heating causes the emissivity and/or sheet resistance of the low-E coating to decrease by at least about 5%.

6. The method of claim 1, wherein the rapid heating causes the emissivity and/or sheet resistance of the low-E coating to decrease by at least about 7%.

7. The method of claim 1, wherein the coated article has a visible transmission of at least about 70%.

8. The method of claim 1, wherein the IR reflecting layer comprises silver.

9. The method of claim 1, wherein the low-E coating has an emissivity ($E_n$) of no greater than about 0.10 and a sheet resistance ($R_s$) of no greater than about 8 ohms/square.

10. The method of claim 1, wherein the heating does not cause the glass substrate to reach a temperature sufficient for thermal tempering or heat bending.

11. The method of claim 1, wherein the glass substrate is not thermally tempered following the recited steps.

12. The method of claim 1, wherein color characteristics, including a* and b* reflective color values, are maintained substantially the same before and after said rapid heating.

13. The method of claim 1, wherein the rapid heating is performed so that the emissivity and/or sheet resistance of the low-E coating decreases by at least about 10% due to the rapid heating.

14. The method of claim 1, wherein the rapid heating is performed so that the emissivity and/or sheet resistance of the low-E coating decreases by at least about 15% due to the rapid heating.

15. A method of making a coated article with reduced emissivity and/or sheet resistance, the method comprising:
   forming a low-E coating on a glass substrate thereby resulting in a coated article, the low-E coating comprising at least one infrared (IR) reflecting layer sandwiched between at least first and second dielectric layers, wherein an uppermost layer of the low-E coating is a silicon nitride layer that is 150-350 angstroms thick; and
   heating the coated article comprising the low-E coating and glass substrate, said rapid heating being performed for 10-50 seconds so that (a) the emissivity and/or sheet resistance of the low-E coating decreases by at least about 3% due to the heating, (b) the glass substrate does not exceed a temperature of about 150 degrees C. during the heating, while also causing the IR reflecting layer to undergo at least some re-crystallization and/or crystal perfection during the heating, and
   wherein the silicon nitride layer which is the uppermost layer of the low-E coating is the layer of the coating closest to a source of said heating.

16. The method of claim 15, wherein said heating of the coated article is performed so that the emissivity and/or sheet resistance of the low-E coating decreases by at least about 5% due to the heating.

17. The method of claim 15, wherein said heating of the coated article is performed so that the emissivity and/or sheet resistance of the low-E coating decreases by at least about 10% due to the heating.

18. The method of claim 15, wherein said heating of the coated article is performed so that the emissivity and/or sheet resistance of the low-E coating decreases by at least about 15% due to the heating.

* * * * *